US006754336B1

(12) United States Patent
Ito (10) Patent No.: US 6,754,336 B1
(45) Date of Patent: *Jun. 22, 2004

(54) TELEPHONE APPARATUS WITH HEARING ASSISTANCE (75) Inventor: Shinichiro Ito, Yokohama (JP)

(73) Assignee: Matsushita Electric Industrial Co., Ltd. (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 237 days.

(21) Appl. No.: 08/909,689

(22) Filed: Aug. 12, 1997

(30) Foreign Application Priority Data

Aug. 27, 1996 (JP) ............................................. 8-225452

(51) Int. Cl.[7] .......................... H04M 1/00; H04R 29/00
(52) U.S. Cl. .................... 379/353; 379/387.02; 381/56; 381/312; 381/98
(58) Field of Search .......................... 379/353, 79, 80, 379/372, 373, 73, 100.08, 421, 388, 389, 390, 387.01, 52; 381/108, 107, 57, 312, 317; 363/85; 455/190.1, 313; 704/267

(56) References Cited

U.S. PATENT DOCUMENTS

| 4,254,304 | A | * | 3/1981  | Fulghum et al. ............. 379/353 |
| 4,679,240 | A | * | 7/1987  | Heide ........................ 381/68.6 |
| 4,724,119 | A | * | 2/1988  | Mock .......................... 379/79 |
| 4,823,380 | A | * | 4/1989  | Kohen et al. ................ 379/387 |
| 4,982,434 | A | * | 1/1991  | Lenhardt et al. ........... 381/68.3 |
| 5,047,994 | A | * | 9/1991  | Lenhardt et al. ........... 381/68.3 |
| 5,391,946 | A | * | 2/1995  | Yamazaki et al. ........... 327/113 |
| 5,450,494 | A | * | 9/1995  | Okubo et al. ................ 381/108 |
| 5,509,081 | A | * | 4/1996  | Kuusama ..................... 381/108 |
| 5,636,285 | A | * | 6/1997  | Sauer ......................... 381/68.2 |
| 5,699,410 | A | * | 12/1997 | Imamura et al. ............. 379/373 |
| 5,721,783 | A | * | 2/1998  | Anderson .................... 381/328 |
| 5,742,189 | A | * | 4/1998  | Yoshida et al. ............ 455/190.1 |
| 5,793,844 | A | * | 8/1998  | Matsuda ....................... 379/79 |
| 5,793,863 | A | * | 8/1998  | Hashimoto ................... 379/387 |
| 5,794,201 | A | * | 8/1998  | Nejime et al. .............. 704/267 |
| 5,796,847 | A | * | 8/1998  | Kaihotsu et al. ............ 381/108 |
| 5,844,983 | A | * | 12/1998 | Lilja .......................... 379/418 |
| 5,867,581 | A | * | 2/1999  | Obara ......................... 381/312 |
| 6,078,670 | A | * | 6/2000  | Beyer .......................... 381/57 |

FOREIGN PATENT DOCUMENTS

GB          2 284 970          6/1995

* cited by examiner

Primary Examiner—Fan Tsang
Assistant Examiner—Ovidio Escalante
(74) Attorney, Agent, or Firm—Connolly Bove Lodge & Hutz LLP

(57) ABSTRACT

A telephone apparatus is disclosed which comprises: a receiving portion for receiving a telephone signal and generating a voice signal from the received telephone signal; a frequency conversion portion responsive to a control signal for frequency-converting the voice signal; and a reproducing portion for reproducing the voice signal from the frequency conversion portion. The frequency converting amount may be controlled externally or may be predetermined. The frequency converting amount data may cleared every communication for various circumstances. The circumference noise level and the frequency conversion amount data are stored when the frequency conversion is commended in an automatic mode during a communication. In the later communication, the frequency conversion may be effected automatically when the circumference noise level is larger than the stored circumference noise level.

3 Claims, 8 Drawing Sheets

TELEPHONE APPARATUS WITH HEARING ASSISTANCE

BACKGROUND OF THE INVENTION

1. Field of the Invention

This invention relates to a telephone apparatus with hearing assistance.

2. Description of the Prior Art

A telephone apparatus with hearing assistance is known. In such a prior art telephone apparatus, an intensity of reproduced voice is increased by a user.

Figure 10:
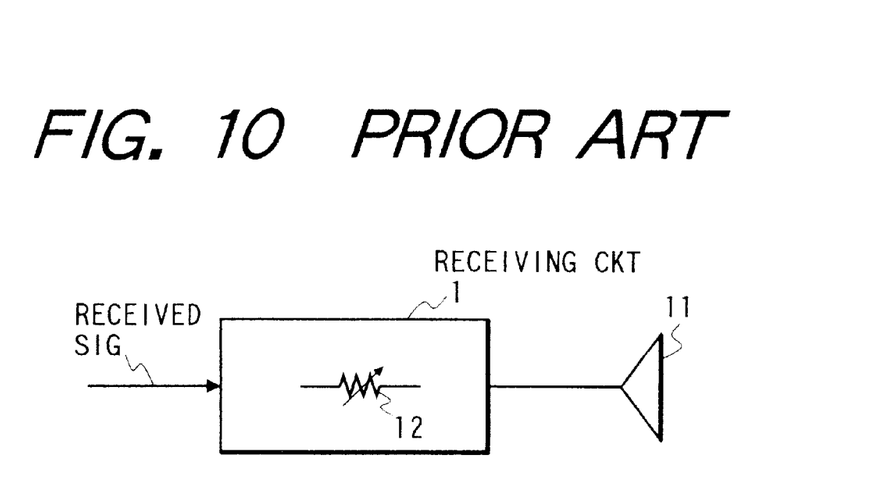
FIG. 10 is a block diagram of a prior art telephone apparatus with an intensity of the received voice controlled.

FIG. 10 is a block diagram of a prior art telephone apparatus with an intensity of the received voice controlled. An intensity of a voice produced by the speaker 11 from the received voice signal is controlled by a volume 12. However, easiness in hearing was not sufficient.

SUMMARY OF THE INVENTION

The aim of the present invention is to provide an improved telephone apparatus.

According to the present invention, a first telephone apparatus is provided, which comprises: a receiving portion for receiving a telephone signal and generating a voice signal from the received telephone signal; a frequency conversion portion responsive to a control signal for frequency-converting the voice signal; and a reproducing portion for reproducing the voice signal from the frequency conversion portion.

In the first telephone apparatus, the frequency conversion portion frequency-converts the voice signal by a predetermined frequency conversion amount.

In the first telephone apparatus, the frequency conversion portion is further responsive to a frequency conversion amount signal and the frequency conversion portion frequency-converts the voice signal in accordance with the frequency conversion amount signal. In this case, it further comprises a storing portion for storing the frequency conversion amount signal and ON-HOOK detection portion for detecting an ON-HOOK condition, and a control portion for storing the frequency conversion amount signal in the storing portion in response to the frequency conversion amount signal and erasing the frequency conversion amount signal in the storing portion in response to the detected ON-HOOK condition.

According to the present invention, a second telephone apparatus is provided which comprises: a receiving portion for receiving a telephone signal and generating a voice signal from the received telephone signal; a frequency conversion portion for frequency-converting the voice signal in accordance with a control signal; a reproducing portion for reproducing the voice signal from the frequency conversion portion; a circumference sound noise level detection portion for detecting a circumference sound noise level; and a control portion for generating the control signal in accordance with the detected circumference sound noise level.

According to the present invention, a third telephone apparatus coupled to a telephone network is provided which comprises: a receiving portion for receiving a telephone signal and generating a voice signal from the received telephone signal; a frequency conversion portion responsive to a control signal for frequency-converting the voice signal in accordance with a frequency conversion amount signal; a reproducing portion for reproducing the voice signal from the frequency conversion portion; a first storing portion for storing the frequency conversion amount signal; a communication condition detection portion for detecting a communication condition; a circumference sound noise level detection portion for detecting a circumference sound noise level; a second storing portion for storing the detected circumference sound noise level; a first control portion responsive to the communication condition detection portion and a frequency control signal for generating the frequency conversion amount signal, operating the frequency conversion portion, storing the frequency conversion amount signal in the first storing portion, and storing the circumference sound noise level in the second storing portion in a communication condition; a comparing portion for comparing the detected circumference sound noise level with the circumference sound noise level in the second storing portion; a second control portion responsive to the communication condition detection portion for reading and supplying the frequency conversion amount signal from the first storing portion to the frequency conversion portion when the detected circumference sound noise level is larger than the circumference sound noise level in the second storing portion in the next communication condition.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

A first embodiment of this invention will be described.

Figure 1:
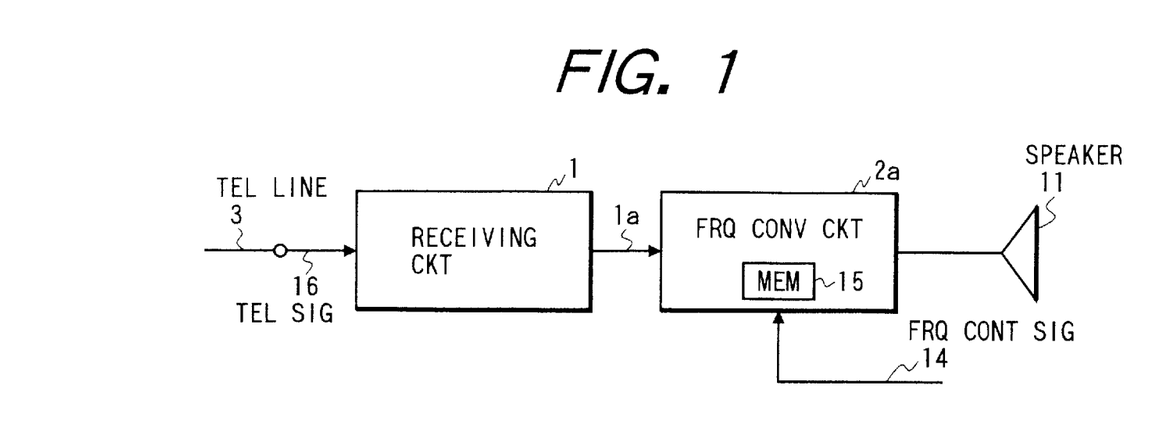
FIG. 1 is a block diagram of a telephone apparatus of a first embodiment.

FIG. 1 is a block diagram of a telephone apparatus of the first embodiment.

The telephone apparatus of the first embodiment comprises a receiving circuit 1 for receiving a telephone signal 16 and outputting a voice signal 1a, a frequency conversion circuit 2a for frequency-converting the voice signal 1a in accordance with a frequency control signal 14, and a speaker 11 for reproducing the voice signal from the frequency conversion circuit 2.

The receiving circuit 1 receives the telephone signal 16 and supplies the voice signal 1a to the frequency conversion circuit 2. The frequency conversion circuit 2 frequency-converts the voice signal 1a in the presence of the frequency control signal 14 with a frequency conversion amount controlled in accordance with data of the frequency conversion amount (frequency control data) in the frequency control signal 14. The frequency conversion circuit 2 outputs the voice signal as it is in the absence of the frequency control signal 14, that is, when the frequency control signal indicates 0.

The data of the frequency conversion amount (frequency control data) is stored in a memory 15 in the frequency conversion circuit 2a and the frequency conversion amount is held during the communication. In the later communication, the stored data of the frequency conversion amount is not used because the circumstance will vary.

A second embodiment will be described.

Figure 2:
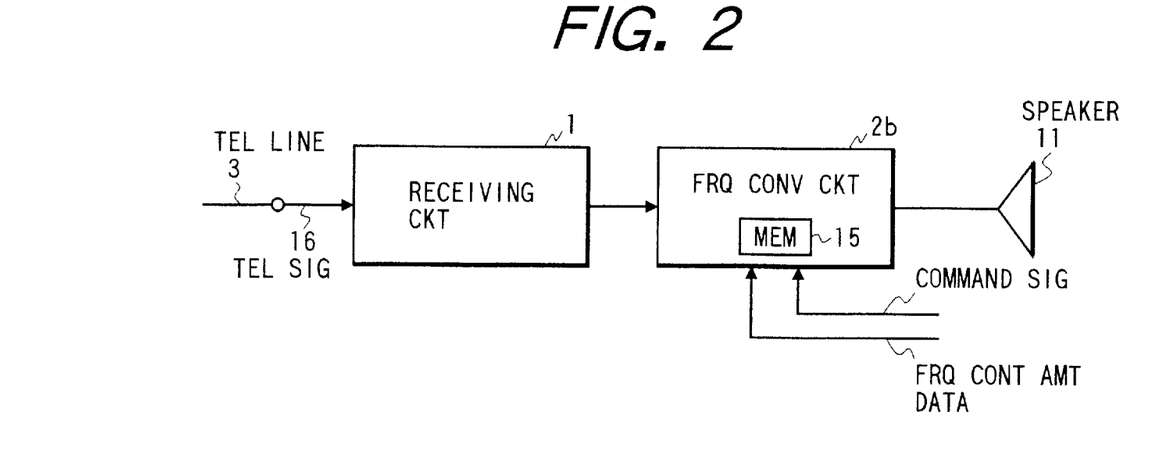
FIG. 2 is a block diagram of a telephone apparatus of a second embodiment.

FIG. 2 is a block diagram of a telephone apparatus of a second embodiment.

In the first embodiment, the frequency control signal 14 includes data of the frequency conversion amount (frequency control data) and the frequency conversion circuit 2a effects the frequency-converting operation only when the data of the frequency conversion amount is other than 0.

In the second embodiment, the frequency conversion circuit 2b effects the frequency-converting operation in response to a command signal and the frequency conversion amount is determined by frequency conversion amount data independently inputted thereto. That is, there are various structures for commanding the frequency converting operation and supplying the data of the frequency conversion amount.

A third embodiment will be described.

Figure 3:
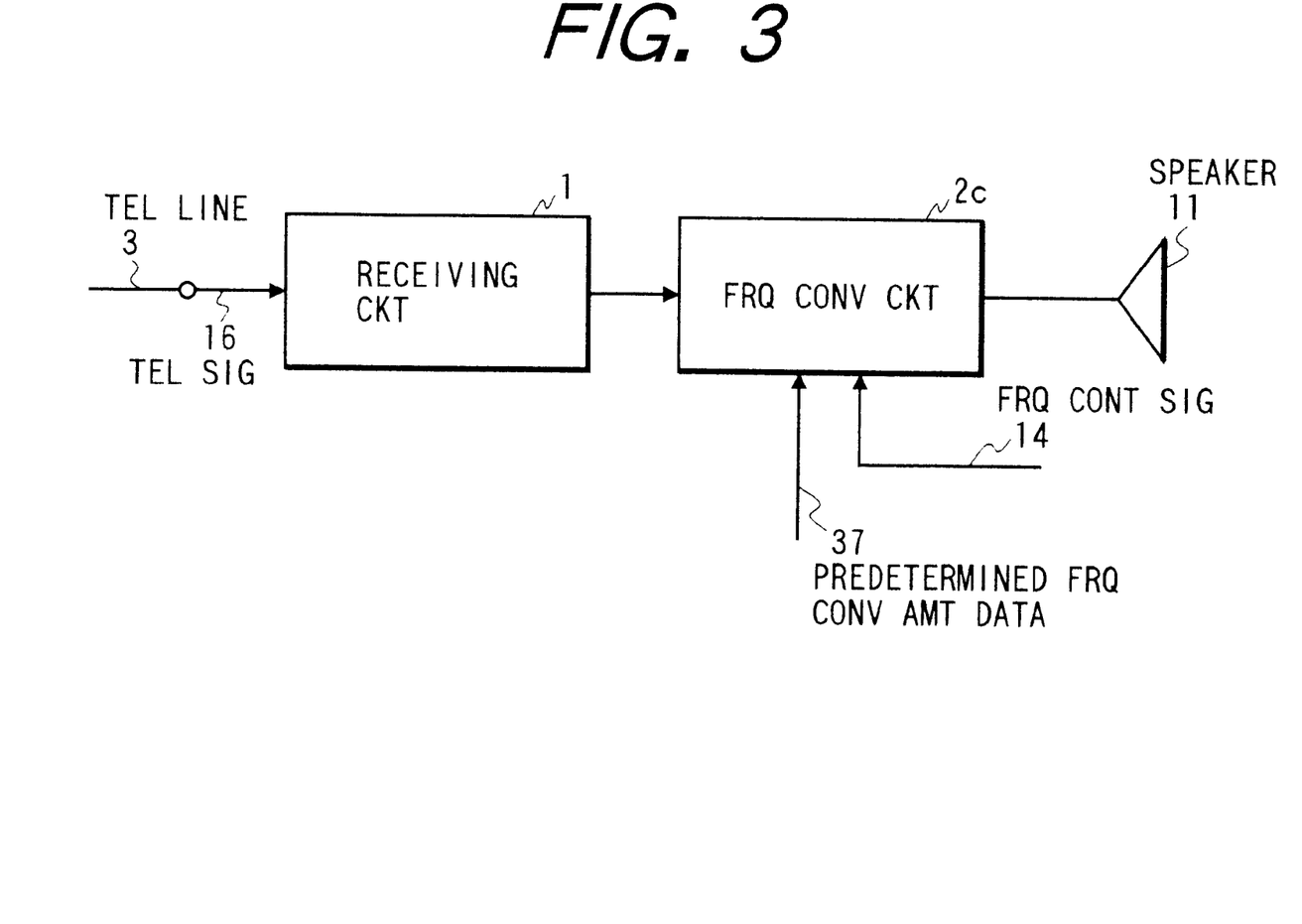
FIG. 3 is a block diagram of a telephone apparatus of a third embodiment.

FIG. 3 is a block diagram of a telephone apparatus of the third embodiment.

The telephone apparatus of the third embodiment is substantially the same as the first embodiment. The difference is that the frequency conversion circuit 2c is supplied with a predetermined frequency conversion amount data 37 and the frequency conversion circuit 2c effects the frequency converting operation by a predetermined frequency conversion amount in response to the frequency control signal 14'. However, it is also possible that the frequency conversion circuit 2c includes the predetermined frequency conversion amount data therein.

A fourth embodiment will be described.

Figure 4:
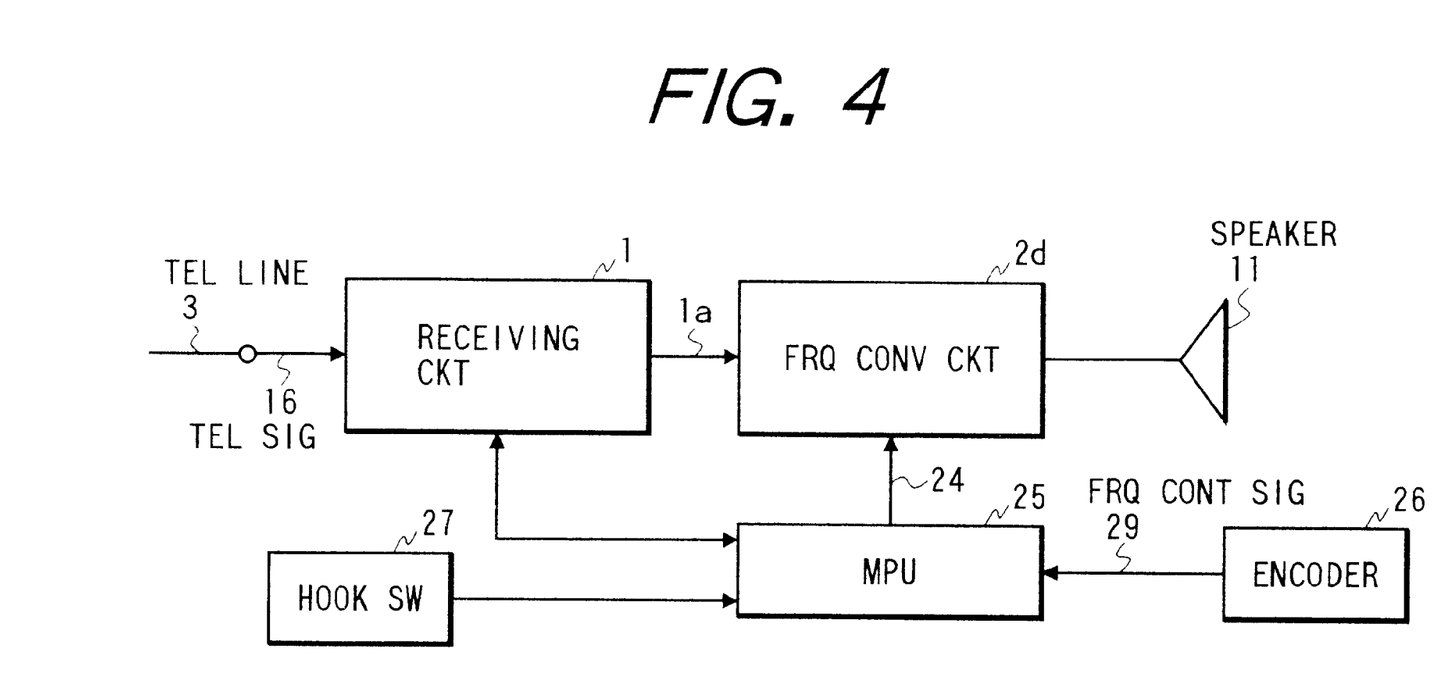
FIG. 4 is a block diagram of a telephone apparatus of a fourth embodiment.

FIG. 4 is a block diagram of a telephone apparatus of the fourth embodiment.

The telephone apparatus of the fourth embodiment comprises the receiving circuit 1 for receiving the telephone signal 16 and outputting the voice signal 1a, a frequency conversion circuit 2d for frequency-converting the voice signal 1a in accordance with frequency control data 24, the speaker 11 for reproducing the voice signal from the frequency conversion circuit 2d, an encoder 26 for generating an encoder signal, as a frequency control signal 29, in response to a manual operation by a user, a hook switch 27, and a microprocessor (mpu) 25 for controlling the frequency conversion circuit 2.

The receiving circuit 1 receives the telephone signal 16 and supplies the voice signal 1a to the frequency conversion circuit 2d. The microprocessor 25 generates the frequency control data 24 in response to the frequency control signal 29 from the encoder 26.

Figure 5:
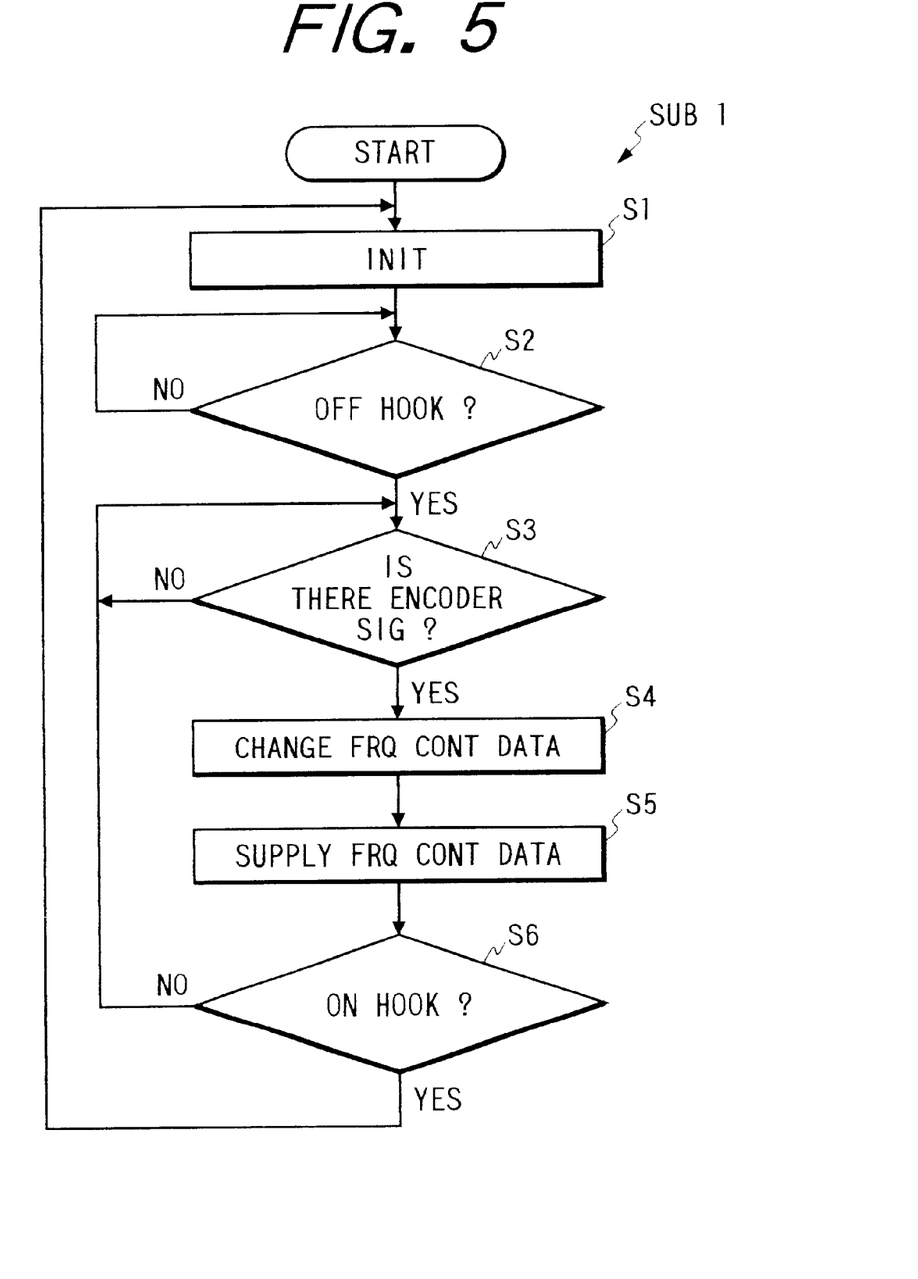
FIG. 5 depicts a flow chart showing an operation of the telephone apparatus of the fourth embodiment, which is also referred in a sixth embodiment.

FIG. 5 depicts a flow chart showing an operation of the telephone apparatus of the fourth embodiment, which is also referred in the later embodiment.

In step s1, the microprocessor 25 initializes a memory therein. In the following step s2, the microprocessor 25 checks whether there is OFF-HOOK by checking the hook switch 27. If there is OFF-HOOK, the microprocessor 25 checks whether there is the encoder signal. If there is the encoder signal, the microprocessor 25 increases, i.e., changes, the frequency control data in accordance with the number of pulses in the encoder signal in step s4. In the following step s5, the microprocessor 25 reads and supplies the frequency control data 24 to the frequency conversion circuit 2d. In the following step s6, the microprocessor 25 checks whether there is ON-HOOK by checking the hook switch 27. If there is no ON-HOOK, processing returns to step s4 to receive the encoder signal. If there is ON-HOOK, processing returns to step s1 to clear the frequency control data 24 in the memory in the microprocessor 25 (store "0" in the memory as the frequency control data) and waits the next call in step s2. The frequency control data is initialized every call because the circumstances will vary.

The data of the frequency converting amount (frequency control data) is stored in the memory of the microprocessor 25, so that the data of the frequency conversion amount is held during the communication. In later communication, the stored data of the frequency conversion amount is not used because the circumstance will vary.

In step s4, it is also possible to decrease the frequency control in accordance with the encoder signal because if the user excessively increases the frequency of the voice signal, the user can decrease the frequency of the voice signal.

In this embodiment, the encoder signal is used as the frequency control signal. However, there are various structures to input the frequency control signal as mentioned in the second embodiment.

A fifth embodiment will be described.

Figure 6:
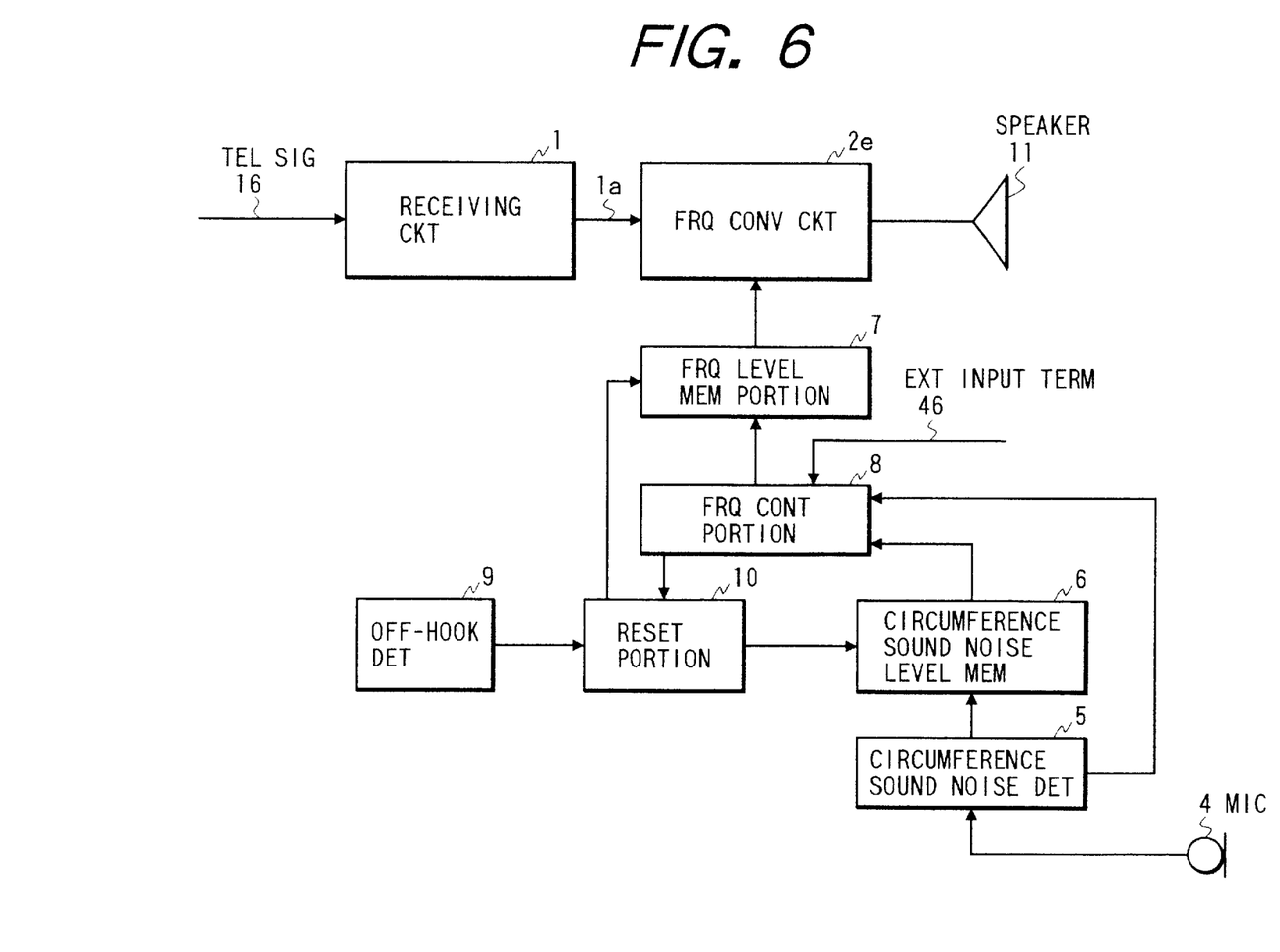
FIG. 6 is a block diagram of a telephone apparatus of a fifth embodiment.

FIG. 6 is a block diagram of a telephone apparatus of the fifth embodiment.

The receiving circuit 1 receives the telephone signal 16 and supplies the voice signal 1a to the frequency conversion circuit 2e. The frequency conversion circuit 2e frequency-converts the voice signal 1a under control by a frequency control portion 8 to provide a voice signal which is easy to be heard by a user. The speaker 11 reproduces the voice signal from the frequency conversion circuit 2e. The data of the frequency conversion amount (frequency control data) is stored in the frequency level memory portion 7.

A microphone 4 receives a circumference sound noise and generates a circumference sound noise signal. A circumference sound noise detector 5 detects a sound noise level from the circumference sound noise signal. A circumference sound noise level memory 6 stores the detected circumference sound noise level. The frequency control portion 8 generates data to be stored in the frequency level memory portion 7. The frequency control portion 8 is either directly controlled by the control signal from an external input terminal 46 or automatically generates a control signal by comparing an output of the circumference sound noise detector 5 with the data in the circumference sound noise level memory 6 to control the data in the frequency level memory portion 7. An OFF-HOOK detector 9 detects completion of a communication. A reset portion 10 clears data in the circumference sound noise level memory 6 and the data in the frequency level memory portion 7.

In a manual operation mode, the frequency control portion 8 determines the frequency control data in response to a control signal from the external input terminal 46 after start of a communication and sends the data to the frequency conversion circuit 2e. The frequency conversion circuit 2e frequency-converts the voice signal from the receiving circuit 1 to generate the frequency converted voice signal which is easy to be heard. The speaker 11 reproduces the frequency-converted voice signal. After completion of the communication, the reset portion 10 responsive to the OFF-HOOK detector 9 resets the data which was set in the frequency level memory portion 7 just after the start of the communication. The circumference sound noise level memory 6 does not operate in the manual operation mode.

An automatic operation mode will be described.

A user controls the frequency control portion 8 through the external input terminal 46 with hearing the voice from the speaker 11 to determine the data in the frequency level memory portion 7. The frequency level memory portion 7 holds the data. At the same time, the circumference sound noise level memory 6 stores the data of the circumference sound noise level for the circumference sound noise detector 5 at this instance. The data in the frequency level memory portion 7 is sent to the frequency conversion circuit 2e and used as frequency data there.

In this automatic operation mode, the frequency control portion 8 controls the reset portion 10 such that the reset portion 10 does not output a reset signal when the communication has completed. Therefore, the data in the circumference sound noise level memory 6 and the data in the frequency level memory portion 7 are stored as they are.

In the future communication after this communication, the frequency control portion 8 compares the level of the circumference sound noise detected by the circumference sound noise detector 5 with the data stored in the circumference sound noise level memory 6 and if the circumference sound noise level detected by the circumference sound noise detector 5 at this instance is larger than the data stored in the circumference sound noise level memory 6, or if the circumference sound noise exceeds a predetermined level, the frequency control portion 8 automatically sends the data stored in the frequency level memory portion which has set in the previous communication to the frequency conversion circuit 2e. Then, the frequency conversion circuit 2e converts the voice signal with the frequency conversion level set in the previous communication reproduced.

If the circumference sound noise level detected by the circumference sound noise detector 5 at this instance is not larger than the data stored in the circumference sound noise level memory 6, or if the circumference sound noise does not exceed the predetermined level, the frequency control portion 8 does not effect the frequency conversion and thus, the voice signal from the receiving circuit is supplied to the speaker 11 with normal frequency maintained.

Moreover, if the user successively sets the frequency control data in the frequency level memory 7 through the external input terminal 46 during a communication, the frequency conversion circuit 2e frequency-converts the voice signal irrespective of the circumference sound noise level. The user adjusts the frequency converting level with hearing the frequency-converted voice signal to a desired level.

A sixth embodiment will be described.

Figure 7:
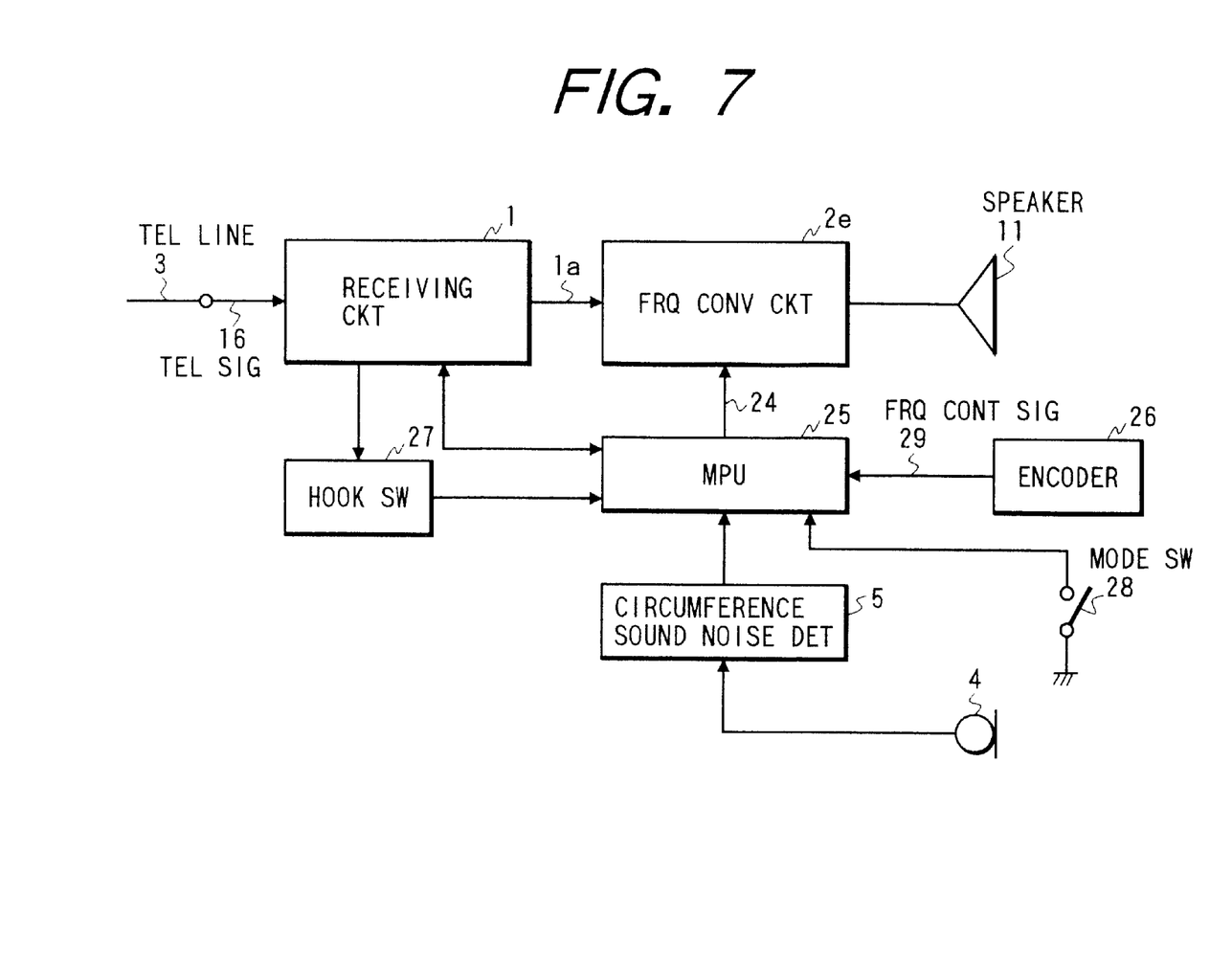
FIG. 7 is a block diagram of a telephone apparatus of the sixth embodiment.

FIG. 7 is a block diagram of a telephone apparatus of the sixth embodiment.

The telephone apparatus of the sixth embodiment comprises the receiving circuit 1 for receiving the telephone signal and outputting the voice signal 1a, a frequency conversion circuit 2e for frequency-converting the voice signal in accordance with frequency control data 24, the speaker 11 for reproducing the voice signal, an encoder 26 for generating an encoder signal, as a frequency control signal 29, in response to a manual operation by a user, and a microprocessor 25 for generating frequency control data 24, a hook switch 27, a microphone 4 for detecting a circumference sound noise, a circumference sound noise level detector 5 for supplying a circumference sound noise level data to the microprocessor 25, and a mode switch 28 for supplying a mode signal indicative of manual and automatic modes to the microprocessor 25.

The receiving circuit 1 receives the telephone signal 16 and supplies the voice signal 1a to the frequency conversion circuit 2e. The microprocessor 25 generates the frequency control data 24 in response to the encoder 26. The microphone 4 and the circumference sound noise detector 5 detects a circumference sound noise level.

Figure 8:
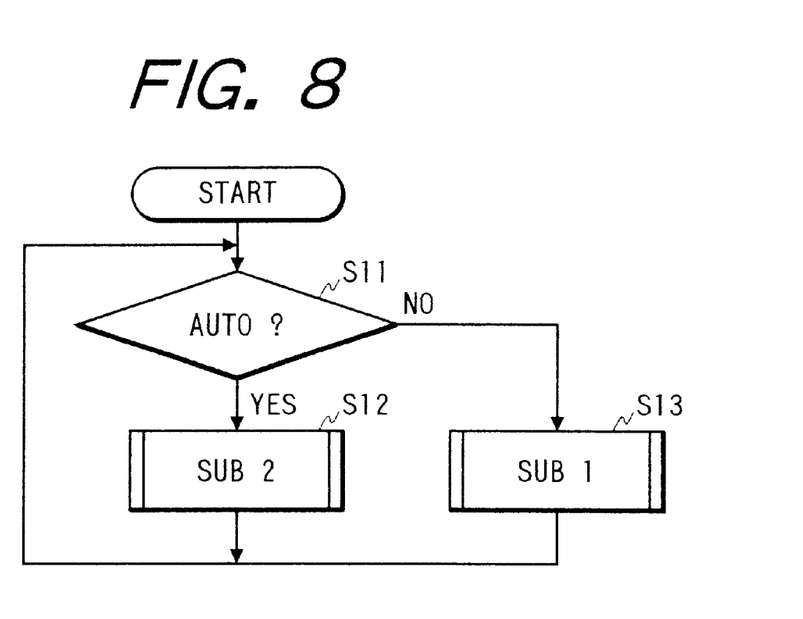
FIGS. 8 and 9 depict flow charts showing an operation of the telephone apparatus of the sixth embodiment.
Figure 9:
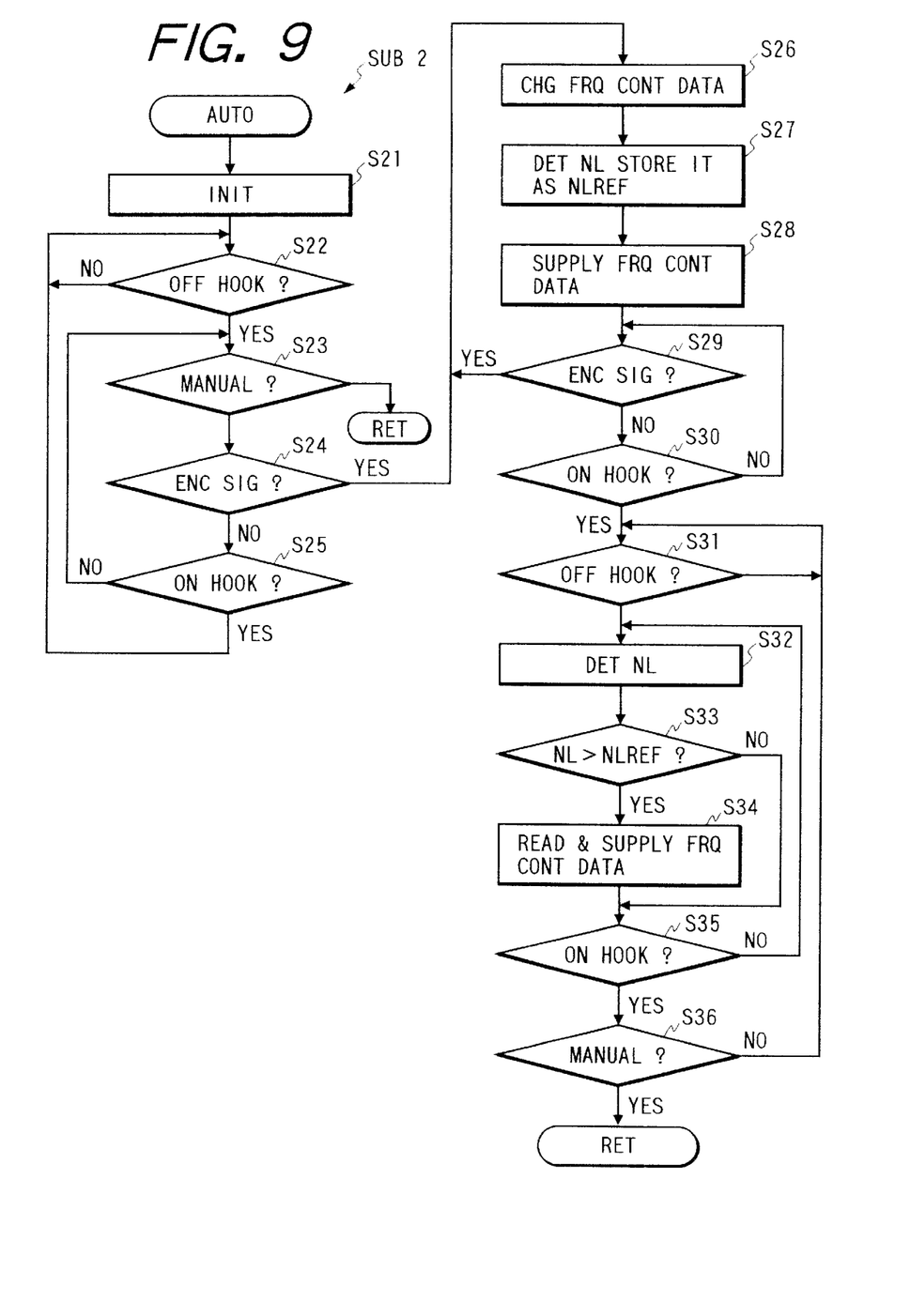

FIGS. 8 and 9 depict flow charts showing an operation of the telephone apparatus of the sixth embodiment and the flow chart shown in FIG. 5 is also referred.

In step s11, the microprocessor 25 checks the mode switch 28 as to whether the mode signal indicates the automatic mode. If the mode signal indicates the manual mode, processing proceeds to step s13 which is a subroutine SUB1 shown in FIG. 3. Then, the microprocessor 25 operates as mentioned above. If the mode signal indicates the automatic mode, processing proceeds to step s12 which is a subroutine SUB2 shown in FIG. 9. In the automatic mode, in step s21, the microprocessor 25 initializes the memory therein. In the following step s22, the microprocessor 25 checks whether there is OFF-HOOK. If there is OFF-HOOK in step s22, the microprocessor 25 checks the mode switch 28 as to whether the mode signal indicates the manual mode. If the mode signal indicates the manual mode, processing returns. If it is still in the automatic mode, processing proceeds to step s24. In step s24, the microprocessor 25 checks whether there is the encoder signal. If there is no encoder signal, the microprocessor 25 checks whether there is ON-HOOK in step s25. If there is no ON-HOOK, processing returns to step s23. If there is ON-HOOK, processing returns to step s22. That is, the microprocessor 25 waits any of the events of the mode signal commanding the manual mode, ON-HOOK, and receiving encoder signal in the loop from step s23 to step s25.

In step s24, if there is the encoder signal, the microprocessor 25 changes, that is, increases, the frequency control data in accordance with the encoder signal and stores it in the memory thereof in step s26. In the following step s27, the microprocessor 25 detects the circumference sound noise level NL detected by the circumference sound noise detector 5 and stores it in the memory thereof. The microprocessor 25 reads and supplies the frequency control data 24 to the frequency conversion circuit 2e in step s28. In the following step s29, the microprocessor 25 checks whether there is the encoder signal again. If there is the encoder signal, processing returns to step s26.

If there is no encoder signal in step s29, the microprocessor 25 checks whether there is ON-HOOK by checking the hook switch 27. If there is no ON-HOOK, processing returns to step s29. If there is ON-HOOK, processing proceeds step s31. Then, the communication has completed and the control data is set in the memory of the microprocessor 25 which will used in the next call. That is, the microprocessor 25 operates the frequency conversion circuit 2e in response to the encoder signal (frequency control data) and stores the generated frequency control data and stored the circumstance noise level NL.

In the next call, that is, in step s32, the microprocessor 25 checks whether there is OFF-HOOK by checking the hook switch 27. If there is OFF-HOOK, the microprocessor 25 detects the circumference sound noise level NL in step s32 and compares the present circumference sound noise level NL with the circumference sound noise level NLREF in the memory. If NL>NLREF, that is, the circumference noise is larger than that of the previous communication, the microprocessor 25 reads and supplies the frequency control data 24 set in the memory in the previous communication in step s34 to operate the frequency conversion circuit 2e to frequency-convert the voice signal such that the reproduced voice is easy to be heard though there is circumference sound noise.

In the following step s35, the microprocessor 25 checks whether there is ON-HOOK. If there is no ON-HOOK, processing returns to step s32 to repeats the processing from s33 to s35.

If there is ON-HOOK, the microprocessor 25 checks whether the mode signal in step s36. If the mode signal still indicates the automatic mode, processing returns to step s31 to wait the next call. If the mode signal indicated the manual mode, processing returns to step s11.

In the operation mentioned above, the circumference level NL is compared with that NLREF stored previously. However, the circumference sound noise level may be compared with a predetermined value. In this case, the step s27 is omitted and in step s33, the detected circumference sound noise level NL is compared with the predetermined level.

What is claimed is:

1. A telephone apparatus comprising:
   receiving means for receiving a telephone signal and generating a voice signal from the received telephone signal;
   frequency conversion means responsive to a control signal and a frequency conversion amount signal for frequency-converting said voice signal, comprising: storing means for storing said frequency conversion amount signal; ON-HOOK detection means for detecting an ON-HOOK condition, and
   control means for storing said frequency conversion amount signal in said storing means in response to said frequency conversion amount signal and erasing said frequency conversion amount signal in said storing means in response to the detected ON-HOOK condition; and
   reproducing means for reproducing said voice signal from said frequency conversion means.

2. A telephone apparatus coupled to a telephone network comprising:
   receiving means for receiving a telephone signal and generating a voice signal from the received telephone signal;
   frequency conversion means responsive to a control signal for frequency-converting said voice signal in accordance with a frequency conversion amount signal;
   reproducing means for reproducing said voice signal from said frequency conversion means;
   first storing means for storing said frequency conversion amount signal;
   communication condition detection means for detecting a communication condition;
   circumference sound noise level detection means for detecting a circumference sound noise level;
   second storing means for storing the detected circumference sound noise level;
   first control means responsive to said communication condition detection means and a frequency control signal for generating said frequency conversion amount signal, operating said frequency conversion means, storing said frequency conversion amount signal in said first storing means, and storing said circumference sound noise level in said second storing means in a communication condition;
   comparing means for comparing the detected circumference sound noise level with said circumference sound noise level in said second storing means;
   second control means responsive to said communication condition detection means for reading and supply said frequency conversion amount signal from said first storing means to the frequency conversion means when the detected circumference sound noise level is larger than said circumference sound noise level in said second storing means in the next communication condition.

3. A telephone apparatus comprising:
   receiving means for receiving a telephone signal and generating a voice signal from the received telephone signal;
   frequency conversion means responsive to a control signal for changing the pitch of said voice signal to either increase or decrease a frequency of said voice signal, said frequency conversion means being further responsive to a frequency conversion amount signal and said frequency conversion means changes the pitch of said voice signal in accordance with said frequency conversion amount signal;
   storing means for storing said frequency conversion amount signal and ON-HOOK detection means for detecting an ON-HOOK condition, and control means for storing said frequency conversion amount signal in said storing means in response to said frequency conversion amount signal and erasing said frequency conversion amount signal in said storing means in response to the detected ON-HOOK condition; and
   reproducing means for reproducing said voice signal from said frequency conversion means.

* * * * *